I. S. WEST.
HUB ATTACHING DEVICE.
APPLICATION FILED MAR. 31, 1909.
938,804.
Patented Nov. 2, 1909.
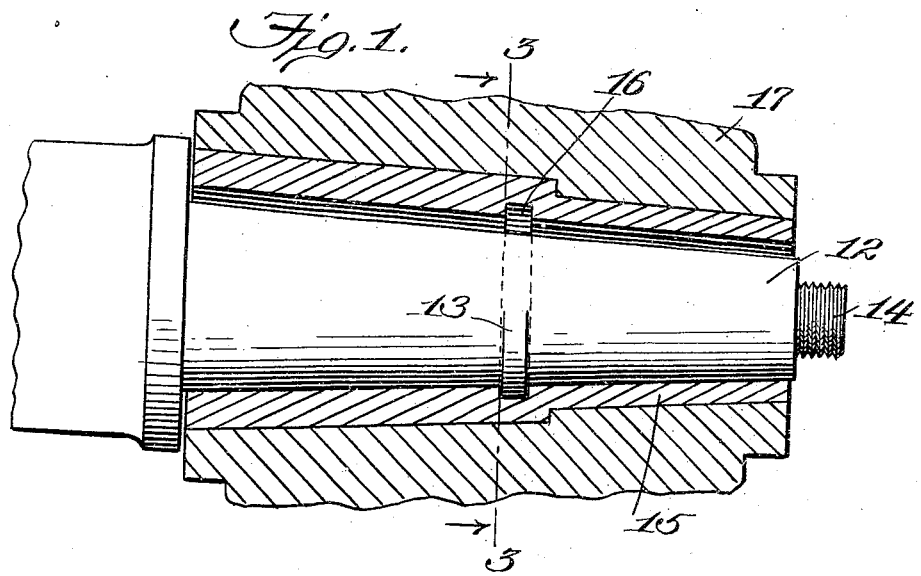
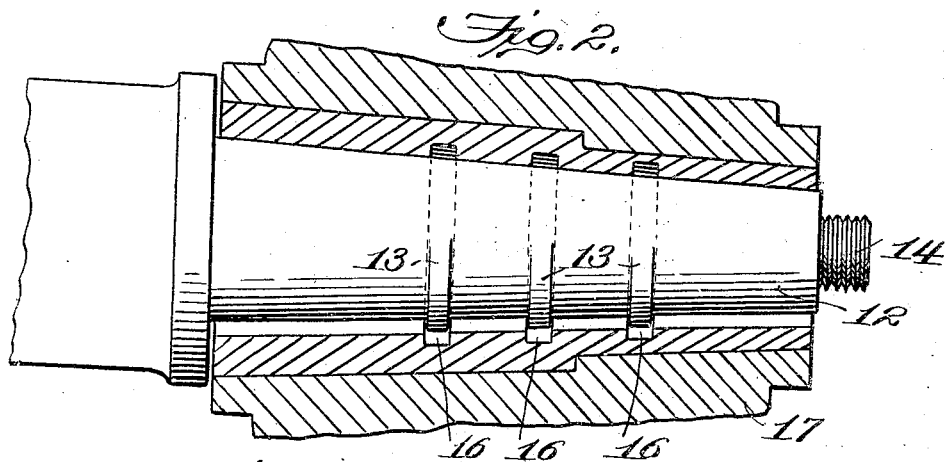
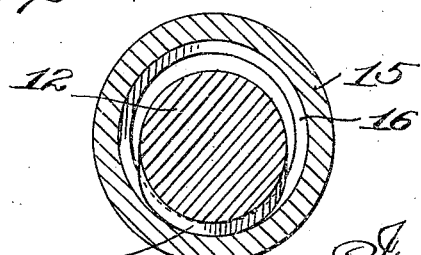
Witnesses:
C. M. Sweeney
J. D. Klinger
Inventor:
Ira S. West,
By Calver & Calver,
Attys.

UNITED STATES PATENT OFFICE.

IRA S. WEST, OF DIFFICULT, TENNESSEE.

HUB-ATTACHING DEVICE.

938,804.

Specification of Letters Patent.

Patented Nov. 2, 1909.

Application filed March 31, 1909. Serial No. 486,955.

*To all whom it may concern:*

Be it known that I, IRA S. WEST, a citizen of the United States, residing at Difficult, in the county of Smith and State of Tennessee, have invented or discovered certain new and useful Improvements in Hub-Attaching Devices, of which the following is a specification, reference being had therein to the accompanying drawings.

This invention has for its object to provide means whereby the hub of a wagon wheel will be connected with the axle in such a manner that should the usual attaching nut accidentally be lost the wheel cannot come off from the axle, so long as it rests on the ground, but may be removed, when desired, when the axle is lifted by a jack, or otherwise, in such a manner as to raise the wheel from the ground or relieve it from weight. To this end the axle is provided on its under side with one or more curved transverse ribs loosely received in an annular groove or grooves in the interior of a thimble or bushing secured to the hub of a wheel, and which thimble or bushing fits the axle somewhat loosely, so that the wheel may be readily placed on the axle or removed therefrom, but when it rests on the ground the rib or ribs on the axle will be held in the groove or grooves of the bushing or thimble, and thus prevent the wheel from coming off the axle.

In the accompanying drawings, Figure 1 is a vertical section, illustrative of the invention, and with the parts in the positions which they will occupy when the wheel is resting on the ground. Fig. 2 is a similar view, but showing a plurality of ribs and grooves with the parts in the position they will occupy when the axle is lifted to raise the wheel slightly from the ground or relieve it from weight. Fig. 3 is a cross section on line 3—3, Fig. 1.

Referring to the drawings, 12 denotes the hub-receiving part of a carriage or wagon axle, and which part is provided on its lower side with one or more curved transverse ribs 13, said part having at its outer end a threaded portion 14 adapted to receive an ordinary attaching nut. Loosely surrounding the axle part 12 is a thimble or sleeve 13 provided with an interior annular groove or grooves 16 loosely receiving the rib or ribs 13, the said thimble or sleeve being fitted tightly into the hub portion 17 of the wheel. The looseness or play between the axle portion 12 and the thimble or sleeve 15 is preferably approximately equal to the height of the rib or ribs 13, in order to permit the wheel to be properly mounted or placed upon or removed from the axle, but such mounting or removal may be provided for by making the adjacent surfaces of one of these parts somewhat eccentric in cross section, instead of exactly circular.

When the wheel rests upon the ground or other supporting surface the weight on the wheel will hold the rib or ribs 13 in the annular groove or grooves 16, so that should the attaching nut be accidentally lost the wheel will be prevented from coming off from the axle by the engagement of the said rib or ribs in said groove or grooves; but when it is desired to remove the wheel from the axle the said wheel will be relieved of weight by lifting the axle with an ordinary jack, or otherwise, and the thimble or bushing and the axle will then occupy the relative positions shown in Fig. 2, with the rib or ribs 13 disengaged from the groove or grooves 16, and the wheel may then be readily removed from the axle, as will be understood.

In addition to the function of retaining the wheel on its axle the rib and groove construction of the axle and the thimble or sleeve affords means whereby oil or other lubricant is retained within the wheel hub.

Having thus described my invention I claim and desire to secure by Letters Patent:

The combination with a vehicle axle provided on its lower side with one or more transverse curved ribs, of a thimble or bushing loosely fitting the said axle and provided with one or more interior annular grooves receiving the said rib or ribs, the looseness or play between the said axle and the said thimble or bushing being approximately equal to the height of the said rib or ribs.

In testimony whereof I affix my signature, in presence of two witnesses.

IRA S. WEST.

Witnesses:
ROBERT L. BULLARD,
GEORGE W. HUBBARD.